United States Patent
Kamisuwa

(10) Patent No.: US 6,925,117 B2
(45) Date of Patent: Aug. 2, 2005

(54) DATA TRANSMISSION APPARATUS, METHOD AND PROGRAM, DATA RECEPTION APPARATUS AND METHOD, AND DATA TRANSMISSION AND RECEPTION SYSTEM, USING DIFFERENTIAL DATA

(75) Inventor: Yoshikatsu Kamisuwa, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 188 days.

(21) Appl. No.: 10/385,663

(22) Filed: Mar. 12, 2003

(65) Prior Publication Data

US 2004/0179603 A1 Sep. 16, 2004

(51) Int. Cl.⁷ ................................................. H04N 7/12
(52) U.S. Cl. .................................. 375/240.01; 382/103
(58) Field of Search .............................. 341/50, 51, 76; 385/103, 305, 233; 382/103, 303; 375/401.01

(56) References Cited

U.S. PATENT DOCUMENTS 5,416,520 A * 5/1995 Kuzma .................. 375/240.12
5,485,211 A * 1/1996 Kuzma .................. 375/240.16
6,075,899 A * 6/2000 Yoshioka et al. ........... 382/233
6,661,725 B2 * 12/2003 Roh ........................... 365/216
2001/0022862 A1 * 9/2001 Alm ........................... 382/305

OTHER PUBLICATIONS

U.S. Appl. No. 09/955,292, filed Sep. 19, 2001, Kamisuwa.

* cited by examiner

Primary Examiner—Michael Tokar
Assistant Examiner—Linh V. Nguyen
(74) Attorney, Agent, or Firm—Foley & Lardner LLP

(57) ABSTRACT

A data transmission apparatus and the like are provided which, in sending data of a large capacity such as still image data, can significantly reduce an amount of transmission data while suppressing deterioration of the data. The transmission apparatus of the present invention include: a differential data calculation section for, assuming that data to be a reference is reference data and data to be compared with the reference data is object data, comparing the reference data and the object data to calculate a difference between both the data as differential data; a differential data amount reduction section for reducing a transmission data amount of the differential data obtained by the differential data calculation section such that the differential data can be restored; and a data transmission section for sending the differential data with its data amount reduced by the differential data amount reduction section.

18 Claims, 13 Drawing Sheets

SMALL AREA IN DIVIDED AREA 303

DATA TRANSMISSION APPARATUS, METHOD AND PROGRAM, DATA RECEPTION APPARATUS AND METHOD, AND DATA TRANSMISSION AND RECEPTION SYSTEM, USING DIFFERENTIAL DATA

BACKGROUND OF THE INVENTION

1. Field of the Invention

The present invention relates to a data transmission apparatus, a data reception apparatus, a data transmission method, a data reception method, a data transmission and reception system, a data transmission program, a data reception program, and a data transmission and reception program which can send information having a large amount of data such as image information by reducing the data amount or can receive the information such that the information can be restored.

2. Description of the Related Art

Conventionally, there has been known a technique with which, when data is sent and received between two computer terminals, a transmission side compresses data to be sent (reduces a data amount such that data can be restored) and sends the data, and a reception side restores the compressed data to its original state (data expansion). According to the technique of data compression, an amount of data to be sent and received can be reduced, whereby communication costs can be held down low and, at the same time, it is easily made possible to handle multimedia data having a large amount of data such as still image data and moving image data with a general personal computer.

As a method of data compression, for example, the JPEG (compression standards for color still images) for still images, the MPEG (compression standards for color moving images) for moving images, and the like are well known.

The JPEG for still images and the MPEG for moving images realize reduction in a data amount by curtailing image data in a degree unnoticeable for human eyes.

On the other hand, as a method of sending and receiving a large capacity of data such as a still image or a moving image without using the compression technique, there is known a method of installing a leased line as it is often used in printing industries or the like. Deterioration of data can be prevented and transmission and reception of data can be performed at a high speed when the leased line is used.

Since the still image data compression method such as the JPEG for still images realizes reduction in a data amount by curtailing data as described above, deterioration of data becomes conspicuous when a degree of compression is increased. Therefore, it is difficult to realize significant reduction in a transmission data amount only through the compression technique.

In addition, although the method of installing a leased line for sending and receiving a large amount of data can send and receive a large amount of data while suppressing deterioration of data, costs for arranging the infrastructure of leased line installation become extremely high.

SUMMARY OF THE INVENTION

The present invention has been devised in order to solve the above-described problems, and it is an object of the present invention to provide a data transmission apparatus, a data reception apparatus, a data transmission method, a data reception method, a data transmission and reception system, a data transmission program, a data reception program, and a data transmission and reception program which, when sending a large capacity of data such as still image data, can significantly reduce a transmission data amount of the data to realize reduction in communication costs (communication time, price) and, at the same time, can suppress deterioration of the data as much as possible.

In order to solve the above-described problems, the present invention has been devised based upon a knowledge that, in the case in which data to be a reference is assumed to be reference data and data to be compared with the reference data is assumed to be object data (in particular, data processed and corrected based upon the reference data), in sending the object data, when a reception side is assumed to be in a state in which it can hold the reference data to be a reference of the object data in advance, the reception side can restore the original object data by compounding the reference data and differential data of the reference data and the object data if the differential data is simply sent to the reception side.

That is, according to the present invention, a data transmission apparatus is provided which includes: a differential data calculation section for, assuming that data to be a reference is reference data and data to be compared with the reference data is object data, comparing the reference data and the object data to find a difference between both the data as differential data; a differential data amount reduction section for reducing a transmission data amount of the differential data obtained by the differential data calculation section such that the differential data can be restored; and a data transmission section for sending the differential data with its data amount reduced by the differential data amount reduction section.

According to such as structure, since an object of transmission is not object data to be sent itself but is only the differential data equivalent to a difference between the reference data and the object data, the object data can be sent at low communication costs while suppressing deterioration of the data. In addition, since the compression technique such as the JPEG can be utilized in the differential data reduction section with respect to the differential data, an amount of data to be sent can be further reduced and communication costs decrease more.

According to such a structure, in the case in which a plurality of reference data are prepared, the reception side can easily determined which reference data should be used to perform restoration.

In addition, the present invention is a data transmission program which is stored in a computer readable medium in order to cause the computer to execute data transmission processing, the program causing the computer to execute: a differential data calculation step of, assuming that data to be a reference is reference data and data to be compared with the reference data is object data, comparing the reference data and the object data to find a difference between both the data as differential data; a differential data amount reduction step of reducing a transmission data amount of the differential data obtained by the differential data calculation step such that the differential data can be restored; and a data transmission step for sending the differential data with its data amount reduced by the differential data amount reduction step.

In addition, according to the present invention, there is provided a data transmission method which includes: a differential data calculation step of, assuming that data to be a reference is reference data and data to be compared with the reference data is object data, comparing the reference data and the object data to find a difference between both the data as differential data; a differential data amount reduction step of reducing a data amount of the differential data obtained by the differential data calculation step such that the differential data can be restored; and a data transmission step for sending the differential data with its data amount reduced by the differential data amount reduction step.

Further, according to the present invention, there is provided a data reception apparatus for receiving data which, assuming that a difference between reference data to be a reference and object data being an object of transmission is calculated as differential data, is sent with a transmission data amount of the differential data reduced such that the differential data can be restored, the data reception apparatus including: a differential data restoration section for restoring the differential data from the received data; and an object data restoration section for restoring the object data based upon the differential data restored by the differential data restoration section and the reference data.

According to such a structure, since the differential data sent by the data transmission apparatus can be restored to be compounded with the reference data which is the reference of the differential data, if only the differential data can be received, the object data, which the data transmission apparatus sets as an object of transmission originally, can be restored as it is.

In addition, the present invention is a data reception program stored in a computer readable medium in order to cause a computer to execute processing for receiving data which, assuming that a difference between reference data to be a reference and object data being an object of transmission is calculated as differential data, is sent with a transmission data amount of the differential data reduced such that the differential data can be restored, the data reception program causing the computer to execute: a differential data restoration step of restoring the differential data from the received data; and an object data restoration step for restoring the object data based upon the differential data restored by the differential data restoration step and the reference data.

In addition, the present invention is a data reception method for receiving data which, assuming that a difference between reference data to be a reference and object data being an object of transmission is calculated as differential data, is sent with a transmission data amount of the differential data reduced such that the differential data can be restored, the data reception method including: a differential data restoration step of restoring the differential data from the received data; and an object data restoration step for restoring the object data based upon the differential data restored by the differential data restoration step and the reference data.

Further, the present invention is a data transmission and reception system including a data transmission apparatus for sending data and a data reception apparatus for receiving the data sent by the data transmission apparatus, in which the data transmission apparatus includes: a differential data calculation section for, assuming that data to be a reference is reference data and data to be compared with the reference data is object data, comparing the reference data and the object data to calculate a difference between both the data as differential data; a differential data amount reduction section for reducing a transmission data amount of the differential data obtained by the differential data calculation section such that the differential data can be restored; and a data transmission section for sending the differential data with its data amount reduced by the differential data amount reduction section, and the data reception apparatus includes: a reference data storage section for storing the reference data; a differential data restoration section for restoring the differential data from the received data; and an object data restoration section for restoring the object data based upon the differential data restored by the differential data restoration section and the reference data stored in the reference data storage section.

According to such a structure, even if an image processing apparatus (an image reading device and an image forming device) having a data transmission apparatus and an image management apparatus having a data reception apparatus are located in remote places from each other, if both the image processing apparatus and the image management apparatus are connected in a state in which they can communicate with each other and image data (reference data) to be a reference of image data outputted by the image processing apparatus is held in the image management apparatus in advance, simply by sending differential data of image data (object data), which is desired to be diagnosed, to be outputted by the image processing apparatus and image data (reference data) to be a reference of the image data to the image management apparatus, the image data (object data) to be an object of diagnosis can be obtained in the image management apparatus.

DESCRIPTION OF THE DRAWINGS

In the accompanying drawings.

DESCRIPTION OF THE PREFERRED EMBODIMENTS

Embodiments of the present invention will be described in detail with reference to the accompanying drawings.

(First Embodiment)

Figure 1:
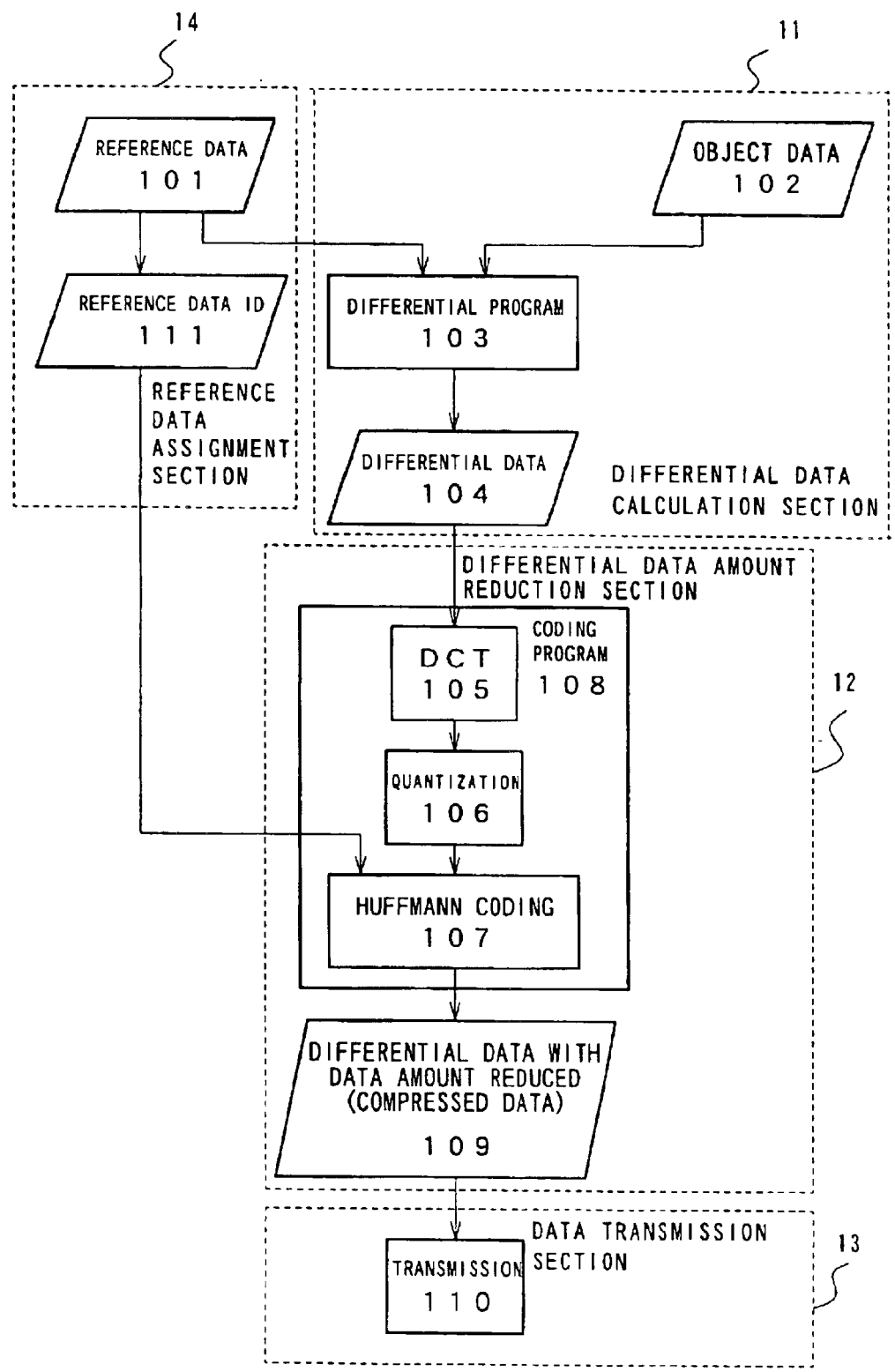
FIG. 1 is a block diagram showing a data transmission apparatus in a first embodiment of the present invention.
Figure 2:
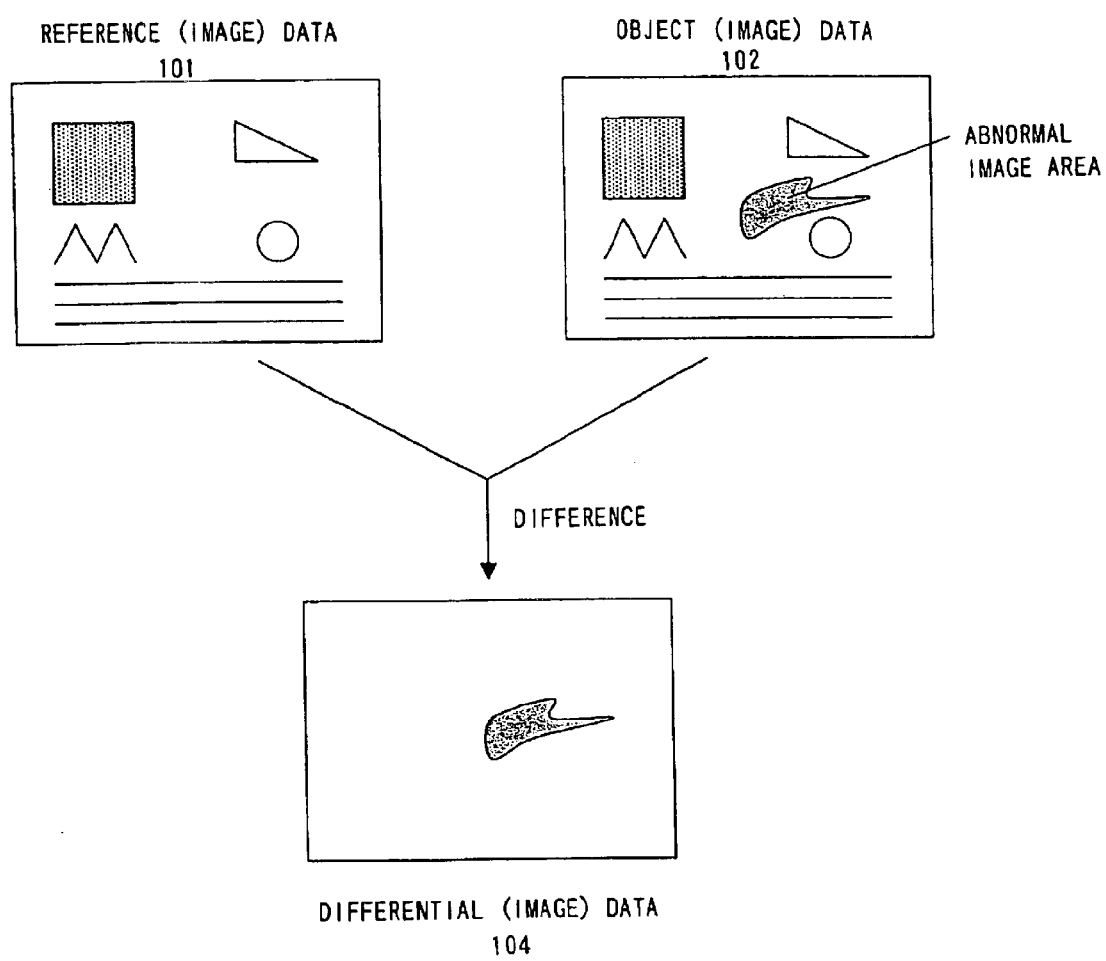
FIG. 2 is a conceptual explanatory view showing an operation of a second embodiment of the present invention.

FIG. 1 is a block diagram showing a data transmission apparatus in a first embodiment of the present invention. FIG. 2 is a conceptual explanatory view showing an operation of a second embodiment of the present invention.

As shown in FIG. 1, the data transmission apparatus of the present invention includes: a differential data calculation section 11 for comparing data (reference data) 101 to be a reference and data (object data) 102 to be an object of transmission to find a difference between both the data as differential data 104; a differential data amount reduction section 12 for reducing a data amount of the differential data 104 obtained by the calculation of the differential data calculation section 11; and a data transmission section 13 for sending differential data 109 with its data amount reduced.

Next, an operation of the data transmission apparatus of the present invention will be described. First, the reference data 101 to be a reference and the object data 102 to be an object of transmission are compared by the differential data calculation section 11. At this point, the differential data calculation section 11 executes a differential program 103 to obtain differential data 104 equivalent to a difference between both the data. Here, in accordance with an example of FIG. 2, the differential data 104 is a difference between the reference (image) data 101 and the object (image) data 102, that is, data of a part corresponding to an abnormal (different from the reference data) image area. A data amount of the obtained differential data 104 is reduced by the differential data amount reduction section 12 and is sent from the data transmission section 13 (110). The data amount of the differential data is reduced by executing a coding program 108 in the differential data amount reduction section 12. As this coding program, a program used for data compression such as the JPEG or the MPEG, which have already been known as a method of reducing a data amount of a still image, a moving image, or the like can be applied. More specifically, DCT (Discrete Cosine Transform) processing 105, quantization processing 106, and Huffmann coding processing 107 are applied to the obtained differential data 104 to obtain compressed data 109.

Next, the case in which reference data ID 111 is sent together with the differential data 104 in the data transmission apparatus of the present invention will be described with reference to FIG. 1. In the case in which a reception side owns a plurality of reference data 101, it is necessary to send data for specifying the reference data 101, which was used for preparation of the differential data 104 to be sent, together with the differential data 104. Thus, the ID number (reference data ID) 111, which has been assigned to each reference data in a reference data assignment section 14, is sent together with the differential data 104 in order to specify the reference data 101. In the case in which a data amount of the differential data 104 is reduced as described above, the reference data ID 111 can also be Huffmann-coded (107) together with the differential data 104.

(Second Embodiment)

Figure 3:
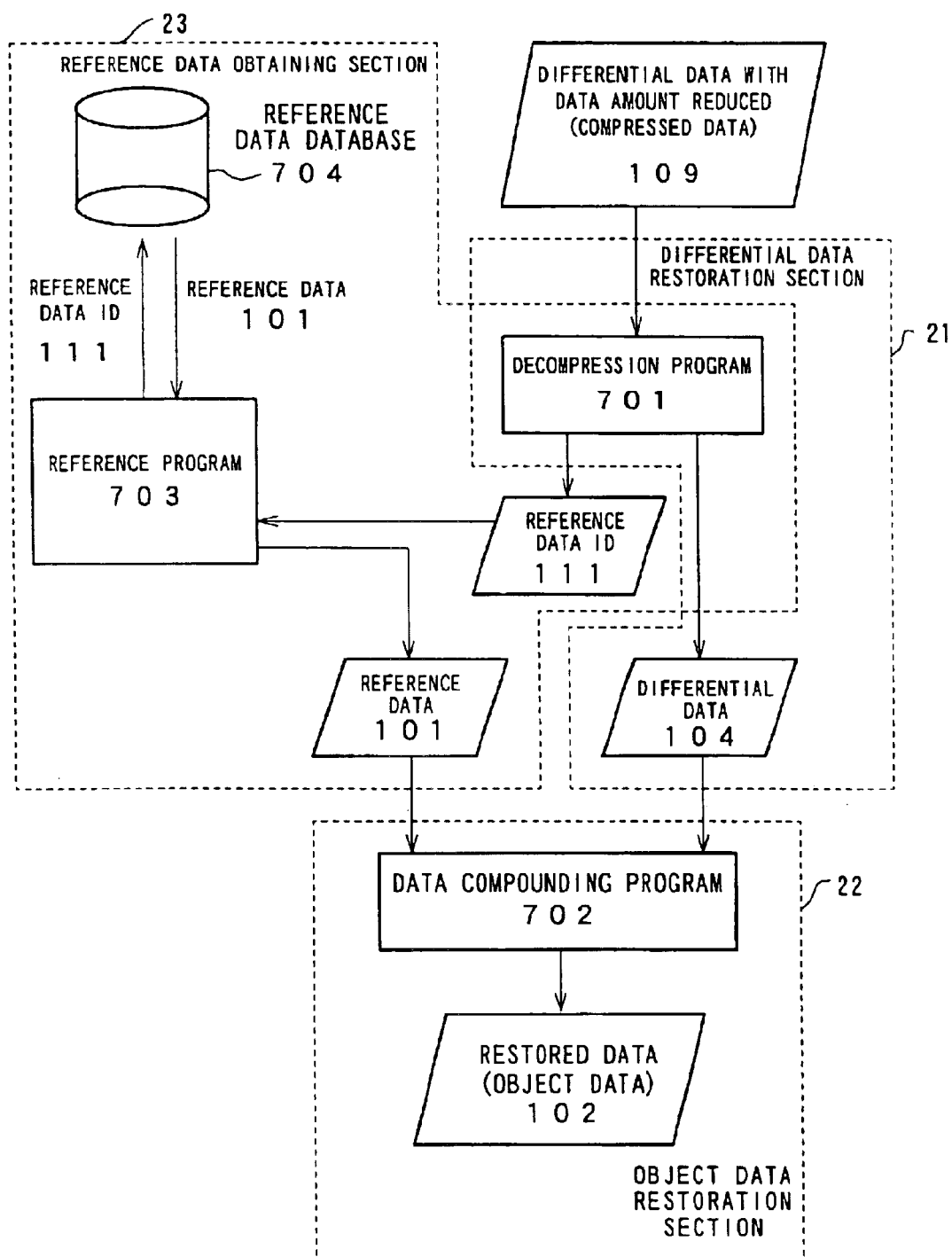
FIG. 3 is a block diagram showing data reception apparatus, which receives data sent from the data transmission apparatus shown in FIG. 1, as the second embodiment of the present invention.

FIG. 3 is a block diagram showing a data reception apparatus, which receives data sent from the data transmission apparatus shown in FIG. 1 as a second embodiment of the present invention. As shown in FIG. 3, the data reception apparatus of the present invention includes: a differential data restoration section 21 for receiving the differential data 109 with its data amount reduced which is sent from the data transmission apparatus and restoring the differential data 109 to the original differential data 104; and an object data restoration section 22 for restoring the object data 102 based upon the reference data 101 corresponding to the differential data 104 and the restored differential data 104. In addition, the data reception apparatus of the present invention includes a reference data obtaining section 23 for retrieving to obtain the reference data 101 based upon the restored reference data ID 111 in the case in which the reference data ID 111 is compressed to be sent from the data transmission apparatus together with the differential data 104.

Decompression of data in the data reception apparatus of the present invention is usually performed by the opposite processing of the processing performed on the transmission side. In the data reception apparatus of the present invention, first, the differential data 109 sent from the data transmission apparatus is decompressed by executing a decompression program 701 to obtain the original differential data 104 in the differential data restoration section 21. In the case in which the reference data ID 111 is included in the sent differential data 109, the reference data ID 111 is simultaneously decompressed. The decompressed differential data 104 is compounded with the reference data 101 corresponding to the differential data 104 by execution of a data compounding program in the object data restoration section 22, and the object data 102 is restored. In the case in which the reference data ID 111 is included in the decompressed data, for example, the reference data 101 having the reference data ID 111 is read out from a database 704 by the execution of a reference program 703 in the reference data obtaining section 23 and supplied to the object data restoration section 22.

(Third Embodiment)

Figure 4:
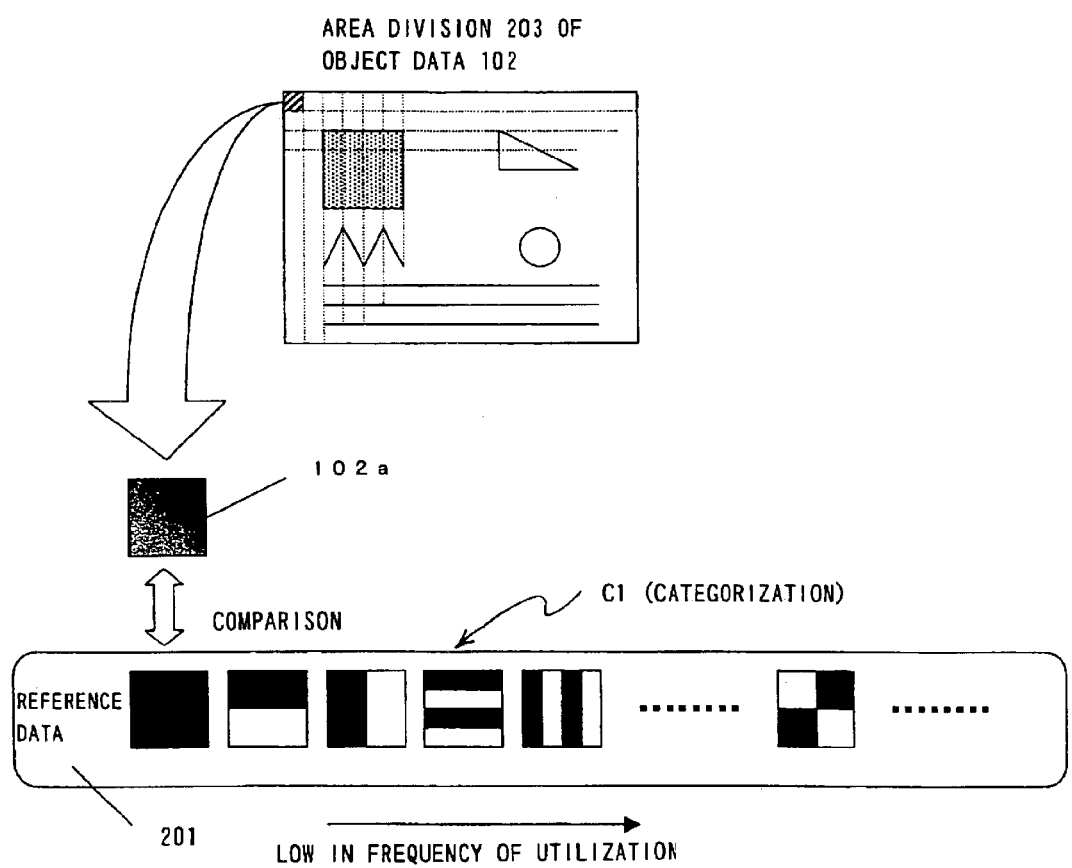
FIG. 4 is a conceptual explanatory view showing a state in which an area of object data is divided and the object data is compared with reference data for each of divided areas.
Figure 5:
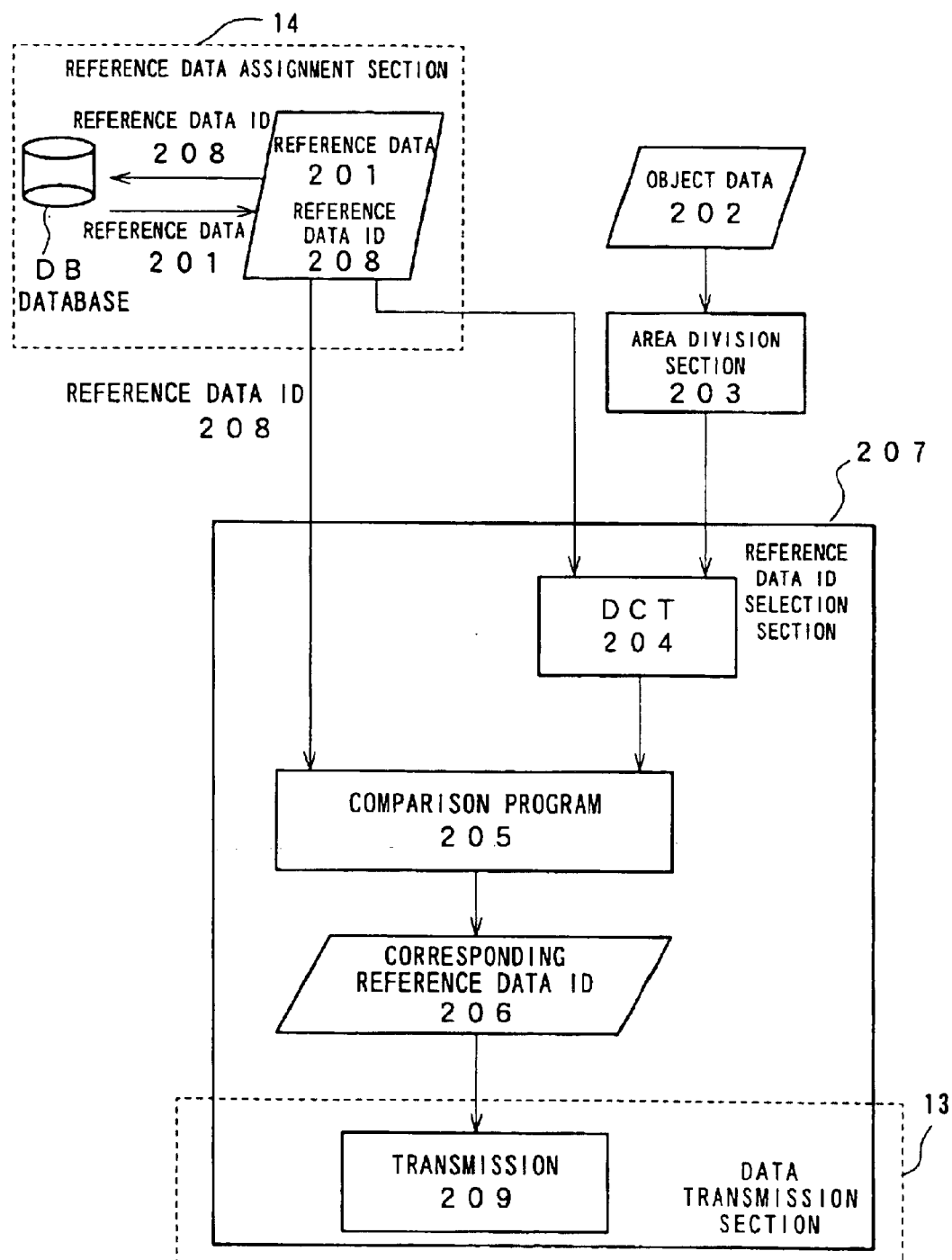
FIG. 5 is a block diagram showing an example of a processing structure on a data transmission apparatus side in the case in which corresponding reference data ID is notified to a transmission side.

In the above-described embodiments, the case in which object data is directly sent is described. However, it is also possible to divide an area of the object data, compare the object data with reference data for each divided area to obtain differential data, and subject the differential data to compression processing and send the compressed differential data. FIG. 4 is a conceptual explanatory view showing a state in which an area of object data is divided and the object data is compared with reference data for each divided area. In this case, if a plurality of reference data to be compared for each area are prepared, for example, it is preferable to select reference data which can make a transmission data amount smallest (reference data most similar to the divided object data) out of the plurality of reference data. In this case, a difference between the divided object data and each selected reference data is found and the divided object data is sent, and it is necessary to inform a transmission side which reference data is used for each area by, for example, specifying the reference data as corresponding reference data ID. FIG. 5 is a block diagram showing an example of processing on the data transmission apparatus side in the case in which an ID of reference data to be compared for each divided area of object data (corresponding reference data ID) is notified to the transmission side.

First, in sending object data 202 from the transmission side, a plurality of reference data 201 of a specific size are held in the data transmission apparatus and the data reception apparatus in advance. In FIG. 5, the data transmission apparatus saves the reference data 201 in a database DB such that the reference data 201 can be read out properly. Then, the object data 202 to be sent is divided (its area is divided) into, for example, data of the same size as the reference data 201 in an area division section 203. Next, a degree of similarity to all the reference data 201 is judged for each of all the divided object data. As an example of this processing, in FIG. 5, DCT processing 204 (which may be pattern matching processing) is performed in a reference data ID selection section 207. DCT parameters obtained by the DCT processing 204 are compared by a comparison program 205, a reference data ID of reference data most similar to each divided object data is judged as a corresponding reference data ID 206, and the corresponding reference data ID 206 is associated for each area of the object data. The corresponding reference data ID 206 associated for each area is sent to the data reception apparatus side. On the data reception apparatus side, reference data obtained from the corresponding reference data ID is applied to each area of the sent differential data to restore the object data. Since this data restoration method itself in each area is the same as that described in the second embodiment, a description of the method will be omitted here. Note that it is needless to mention that the corresponding reference data ID may be sent with each differential data as in the first embodiment.

Note that a reference data ID 208 is, for example, categorized based upon a frequency of use in advance in the reference data ID assignment section 14 in order to realize reduction in a transmission data amount and is coded by the Huffmann coding or the like such that a category with a higher frequency of use has a shorter code length of a code indicating an ID.

This will be described in accordance with FIG. 4. The reference data 201 is categorized based upon a frequency of use such that the frequency of use decreases from the left to the right as indicated by C1. Further, the reference data ID 208 is coded by Huffmann coding or the like such that a code length of a code indicating an ID becomes longer from the left to the right. In the operation shown in FIG. 5, the object data 202 to be sent is divided (its area is divided) into data of the same size as the reference data 201 on the transmission side, divided object data 102a is compared with the reference data 201 which is categorizes as indicated by C1 to calculate a degree of similarity thereof, reference data having a largest degree of similarity is selected, and a corresponding reference data ID of the reference data is sent to the reception side. Note that it is needless to mention that differential data may be sent together with this corresponding reference ID.

(Fourth Embodiment)

Figure 6:
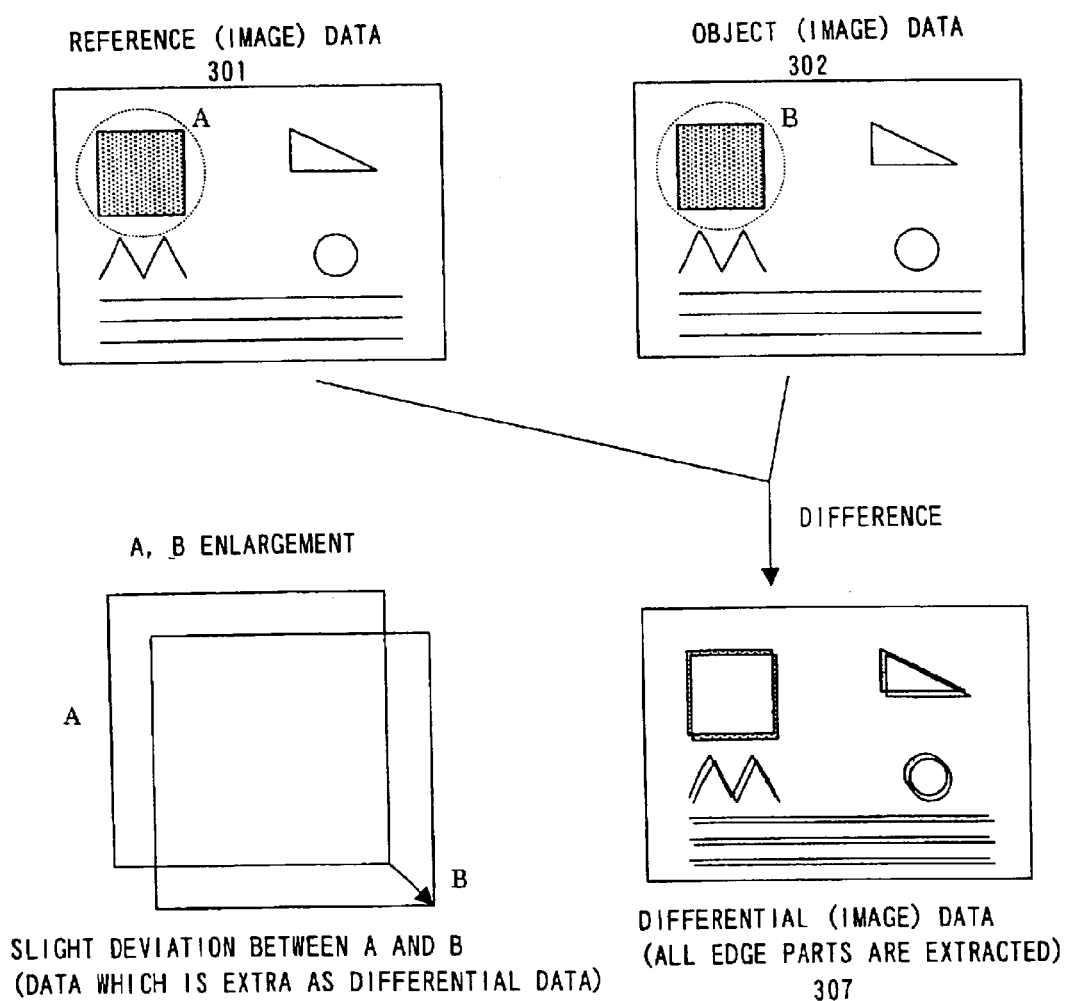
FIG. 6 is a conceptual view showing an operation of a fourth embodiment of the present invention.
Figure 7:
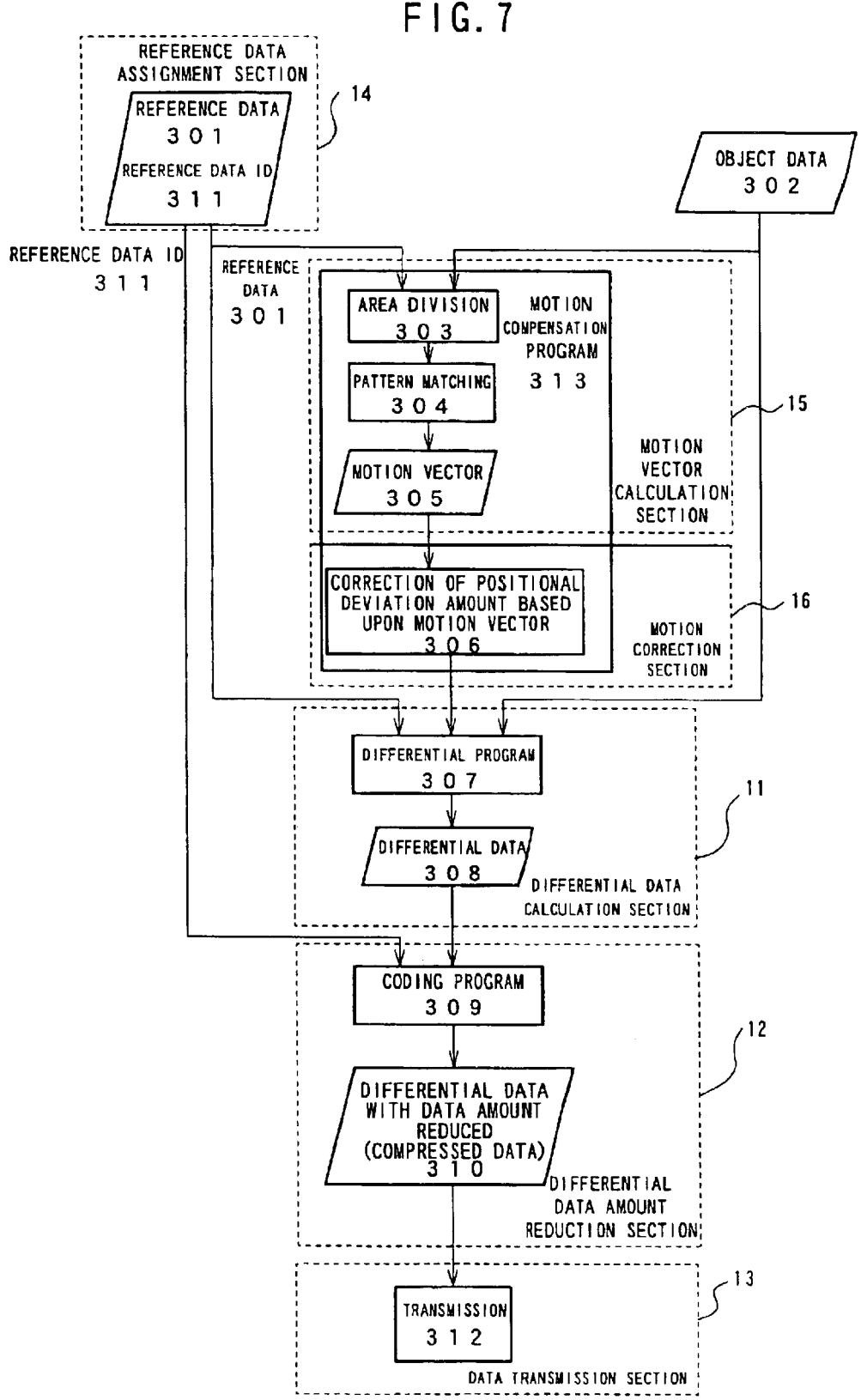
FIG. 7 is a block diagram showing a data transmission apparatus in the fourth embodiment of the present invention.

Next, as a fourth embodiment of the present invention, with reference to FIGS. 6 and 7, the case will be described in which a slight amount of positional deviation between reference data and object data at the time when they are compared is corrected. FIG. 6 is a conceptual view showing an operation of the fourth embodiment. FIG. 7 is a block diagram showing a data transmission apparatus in the fourth embodiment.

For example, in the case in which object data is read by an optical scanner or the like, the object data may not overlap reference data completely even if both the data are entirely the same due to a cause such as characteristics inherent in the scanner or the like, a slight assembly error of members or the like, a way of placing the object data, or a change in a magnification. In this case, as illustrated in FIG. 6, when a difference between reference data (image data) 301 and object data (image data) 302 is found, a difference occurs in an edge part of an image pattern of the reference data 301 (or object data). This difference is data which is extra as differential data 308 to be sent. In such a case, it is desirable to correct (eliminate) a slight amount of positional deviation between the reference data 301 and the object data 302 at the time when both the data are compared. Thus, as illustrated in FIG. 7, the data transmission apparatus of the present invention includes a motion vector calculation section 15 for calculating a motion vector which is an amount of positional deviation between the reference data 301 and the object data 302 prior to differential data calculation by the differential data calculation section 11, and a motion correction section 16 for correcting the amount of positional deviation based upon the motion vector calculated by the motion vector calculation section 15. Note that the structures of the differential data calculation section 11, the differential data amount reduction section 12, and the data transmission section 13 are the same as those shown in FIG. 1.

The reference data 301 and the object data 302 are divided (their areas are divided) into several areas in the motion vector calculation section 15 (303), and a specific pattern is found among the divided area data (hereinafter referred to as pattern matching) (304), whereby a motion vector for each area is obtained as a motion vector 305 indicating an amount of positional deviation between the reference data 301 and the object data 302. In the motion correction section 16, the amount of positional deviation is corrected (306) based upon the obtained motion vector 305. The correction of an amount of positional deviation based upon a motion vector with the motion vector calculation section 15 and the motion correction section 16 can be performed by, for example, execution of a motion compensation program 313 which is programmed to perform calculation of a motion vector in the motion vector calculation section (15), perform motion compensation in a motion compensation section (16), and cause a computer to perform correction of the amount of positional deviation. Thereafter, the reference data 301 and the object data 302, for which the amount of positional deviation has been corrected, are compared in the differential data calculation section 11, and the differential data 308 between both the data is calculated in accordance with the differential program 307. The obtained differential data 308 is sent with a data amount thereof reduced by a coding program 309 in the differential data amount reduction section 12.

Incidentally, the method of correcting an amount of positional deviation between reference data and object data using such pattern matching requires a large amount of calculations. Consequently, in the case in which a data transmission apparatus is incorporated in a copier, since a calculation ability in the copier is limited, it may be difficult to use the pattern matching. On the other hand, when an image pattern is complicated, since a data amount of differential data increases, reduction of a data amount may not be desired.

Figure 8:
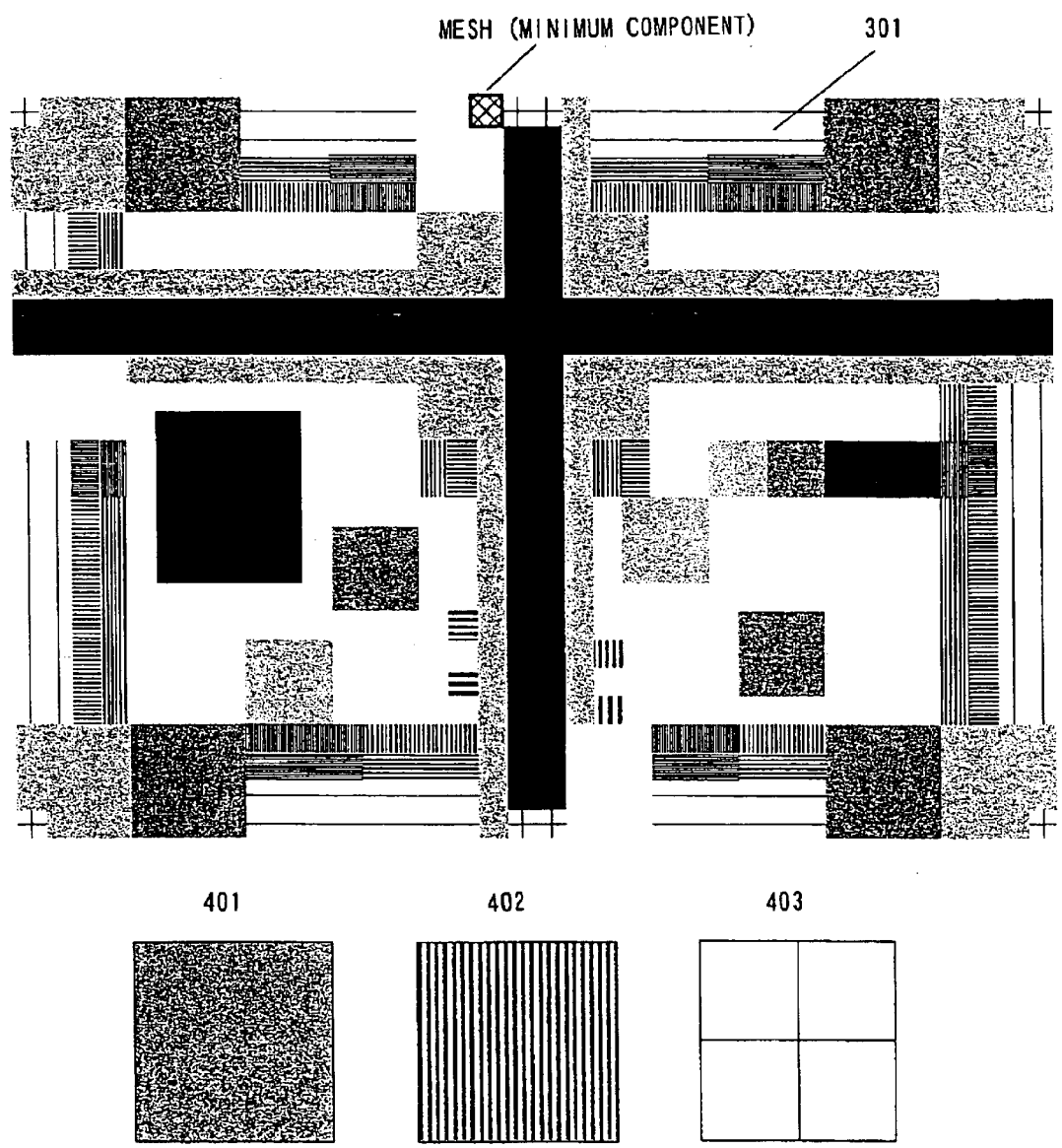
FIG. 8 is a view showing reference data to be divided.
Figure 9:
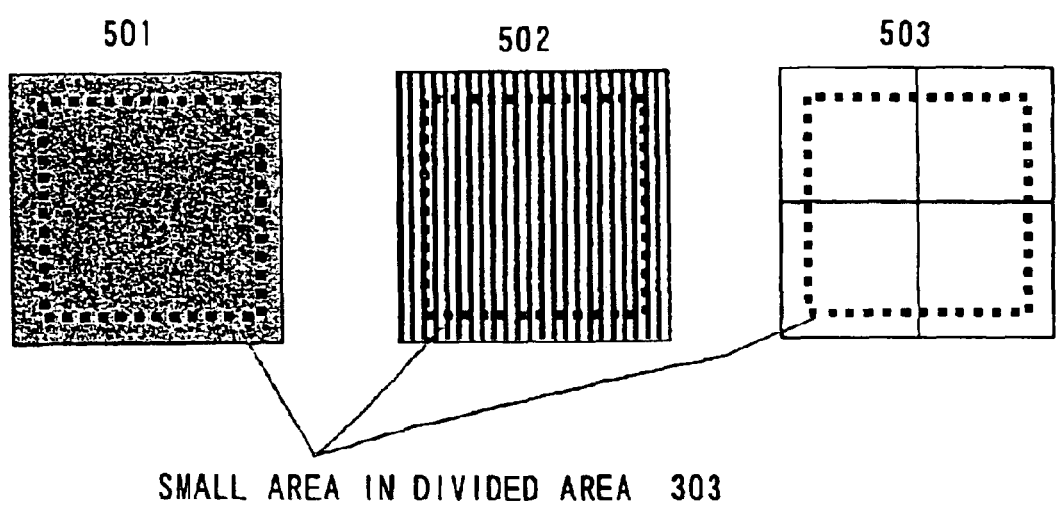
FIG. 9 is a view showing small areas in divided areas of object data.

In such a case, as shown in FIG. 8, improvement can be realized by dividing the reference data 301 into areas of the same size as a divided area size of area division performed in the motion vector calculation section 15 and setting same image patterns (401, 402, 403) in the divided areas. As shown in FIG. 7, according to the motion compensation program 313, the reference data 301 and the object data 302 are divided into several areas by the motion vector calculation section 15. Moreover, as shown in FIG. 9, small areas (501, 502, 503) are provided in the divided areas. The pattern matching 304 among the divided areas is performed for the divided areas (401, 402, 403) of the reference data and the small areas (501, 502, 503) in the divided areas of the object data, and the motion vector 305 is obtained for each area. In doing so, in the areas of the image patterns (401, 501) or the like where a concentration is fixed, since patterns are uniform, the pattern matching 304 can be omitted. In this case, "no motion" may be set in the motion vector 305.

(Fifth Embodiment)

Figure 10:
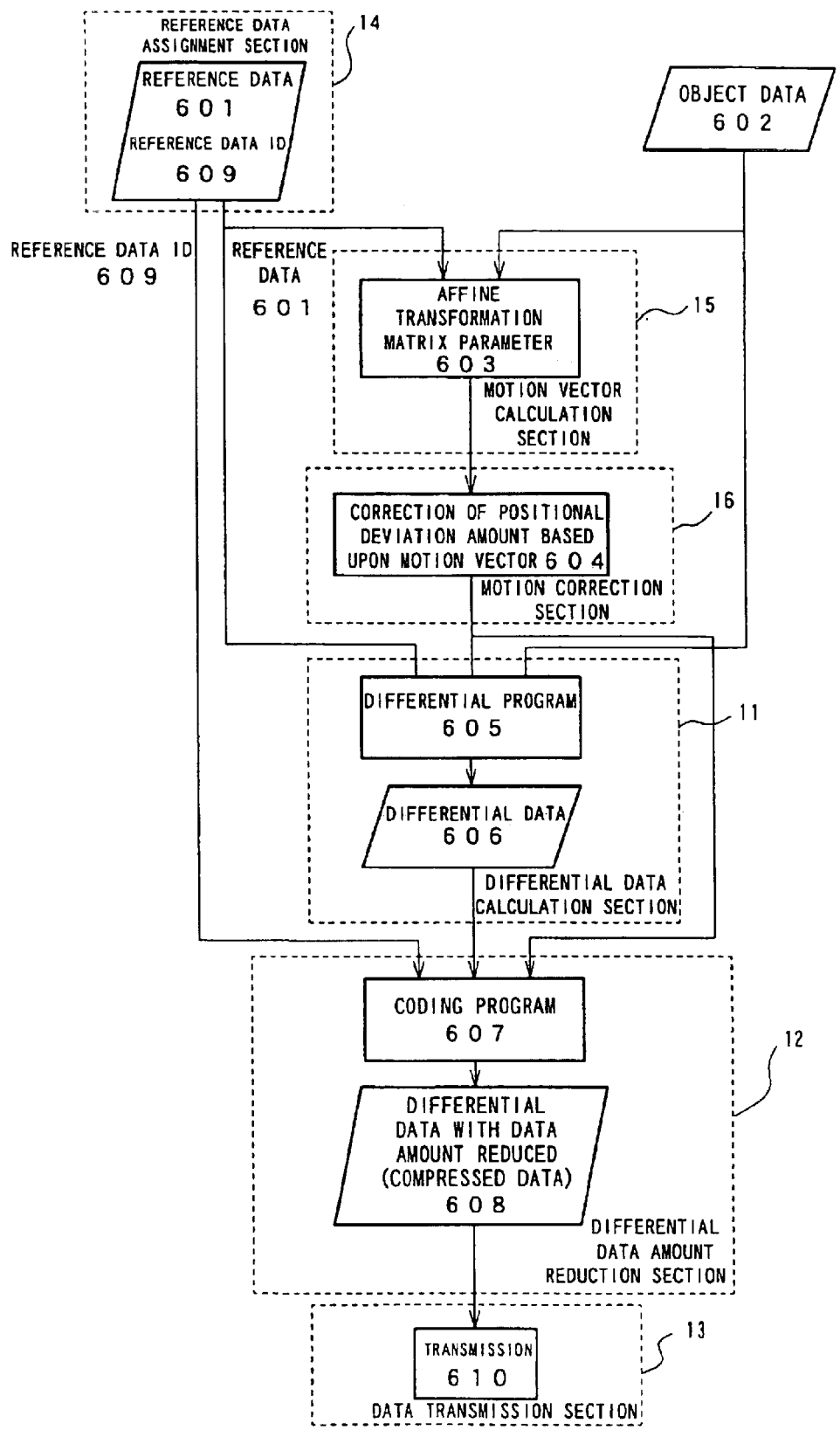
FIG. 10 is a block diagram showing a data transmission apparatus in a fifth embodiment of the present invention.

In a fifth embodiment, the case will be described in which an amount of positional deviation between reference data and object data is corrected utilizing the affine transformation without performing the pattern matching. FIG. 10 is a block diagram showing a data transmission apparatus in the fifth embodiment. In this case, a parallel translation amount, an amount of magnification deviation, and a rotation amount are calculated between entire reference data 601 and object data 602 by the motion vector calculation section 15 to obtain an affine transformation matrix parameter 603. Next, in the motion correction section 16, an amount of positional deviation between the reference data 601 and the object data 602 is corrected based upon the affine transformation matrix parameter 603 obtained by the motion vector calculation section 15 (604). Thereafter, the reference data 601 and the object data 602 after correction are compared by the differential data calculation section 11 to calculate differential data 606. In the differential data amount reduction section 12, a data amount of the obtained differential data 606 is reduced by a coding program 607 in conjunction with the affine transformation matrix parameter 603 and reference data ID 609 (608).

Note that an amount of positional deviation between reference data and object data can also be corrected by combining the above-described pattern matching and affine transformation. In such a case, for example, it is sufficient to execute a motion compensation program (313 in FIG. 7) after the calculation of the affine transformation matrix parameter 603.

(Sixth Embodiment)

A data transmission and reception system of the present invention will be described with reference to FIG. 11.

Figure 11:
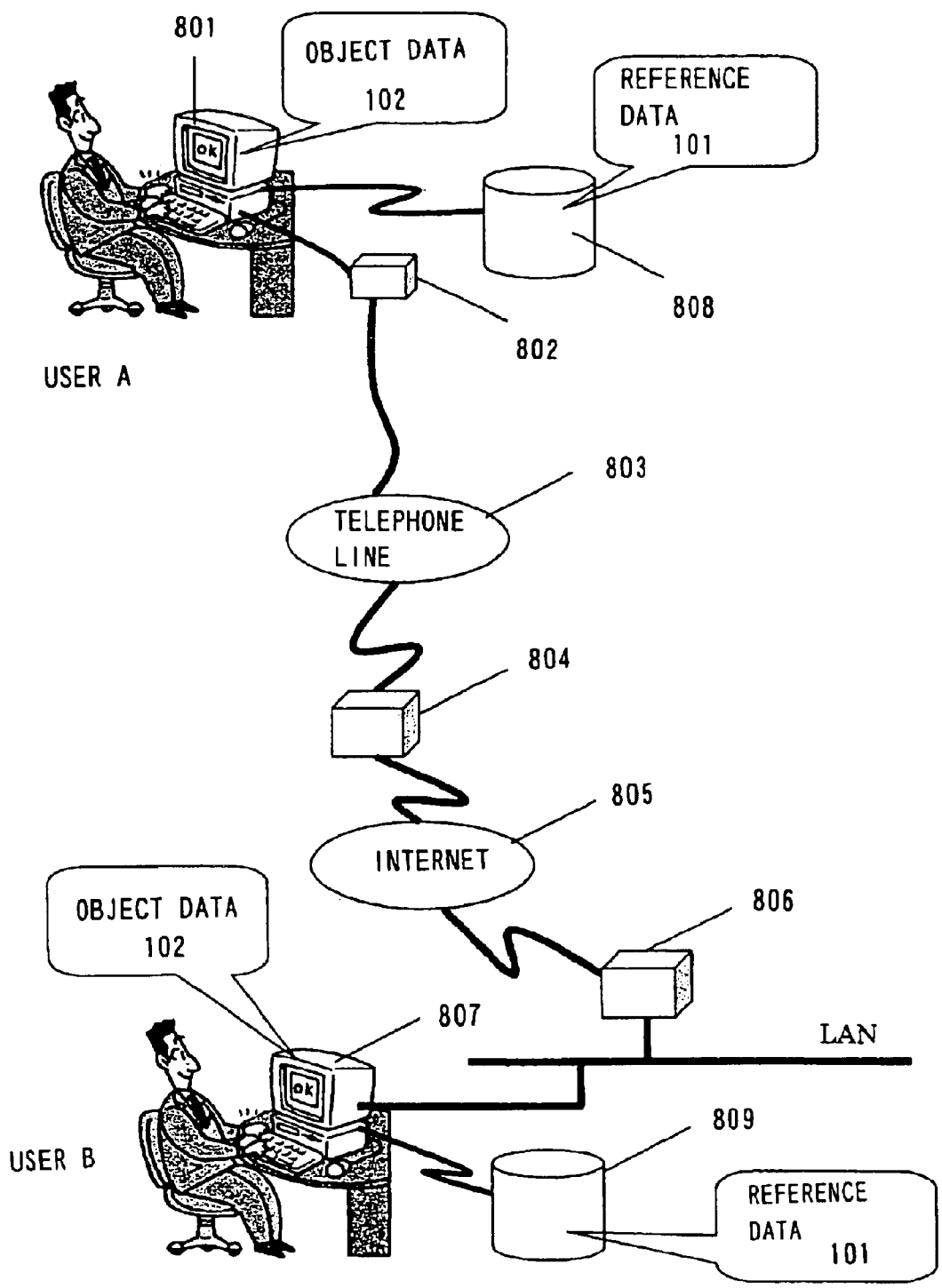
FIG. 11 is a conceptual view showing a data transmission and reception system in a sixth embodiment of the present invention.

As shown in FIG. 11, in the data transmission and reception system of the present invention, a data transmission apparatus 801 and a data reception apparatus 807 of the present invention are connected in a state in which they can communicate with each other. The data transmission apparatus 801 and the data reception apparatus 807 are constituted in advance so as to be able to read the reference data 101 of the same contents. In FIG. 11, the data transmission apparatus 801 and the data reception apparatus 807 are set to directly read same reference data from databases 808 and 809, which have the same reference data 101, independently from each other. Moreover, the data transmission apparatus 801 is connected to the Internet 805 through a telephone line 803, and the data reception apparatus 807 is connected to an LAN environment which is connected to the Internet 805. In this way, the data transmission apparatus 801 and the data reception apparatus 807 are connected in a state in which they can communicate with each other. However, as a connection form, means such as XDSL, FTTH, cable line, or PHS can be adopted arbitrarily.

Here, the case in which data is sent from a user A to a user B will be considered. When the object data 102 sent from the data transmission apparatus 801 is sent to the data reception apparatus 807, the differential data obtained by comparing the object data 102 and the reference data 101 is sent. Object data is data updated by processing and correcting reference data to be a reference and is data desired to be sent. In sending the differential data 104, a data amount thereof is reduced by performing compression or the like as described above. Since the received differential data 104 is usually in a state in which the data mount thereof is reduced, the differential data 104 is restored in the data reception apparatus 807, the reference data 101 corresponding to the differential data 104 is read, and the differential data 104 is compounded with the restored differential data 104 to obtain the original object data 102. However, each of the data transmission apparatus 801 and the data reception apparatus 807 has both a transmission function and a reception function and can perform transmission or reception bi-directionally with each other.

(Seventh Embodiment)

Figure 12:
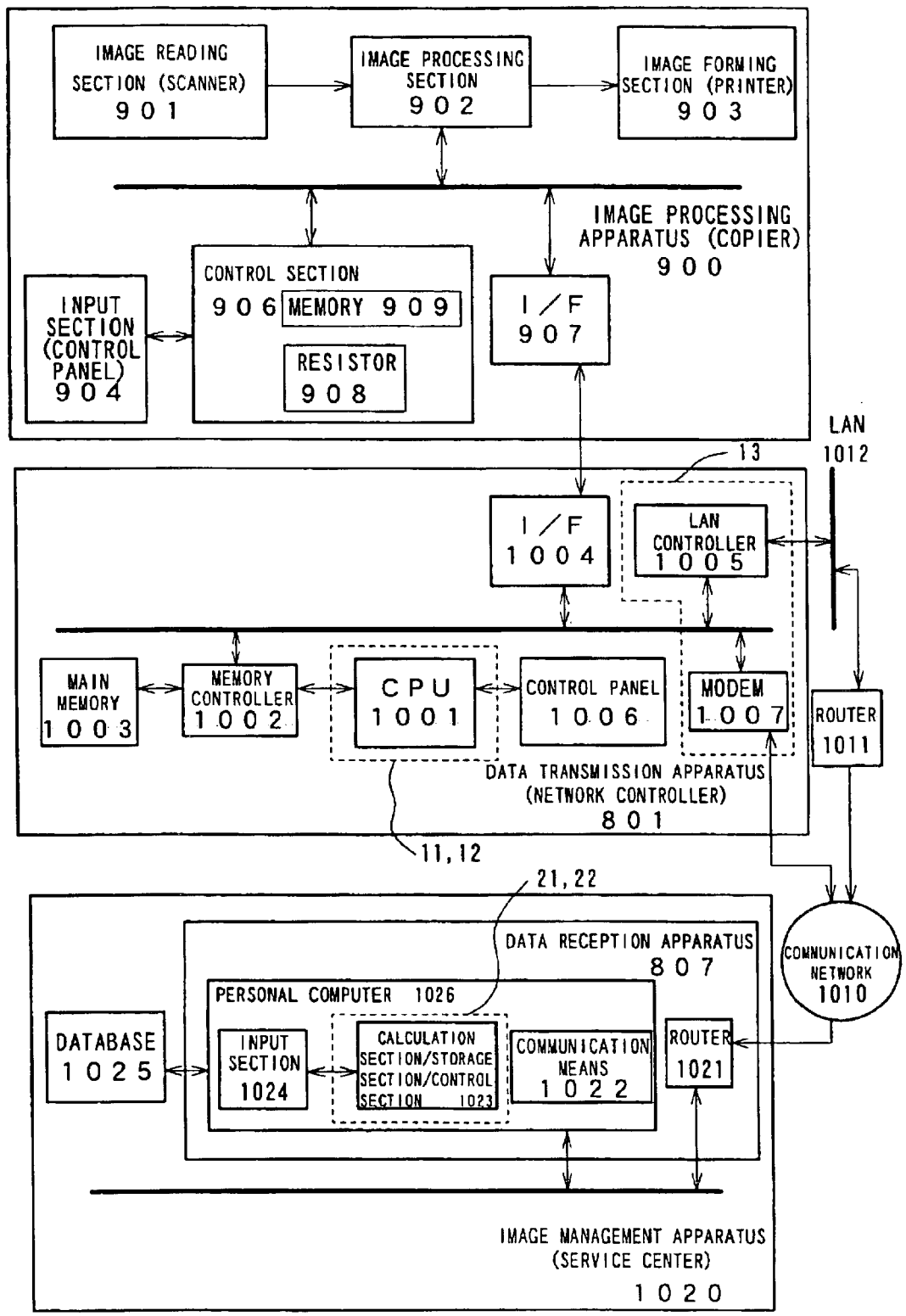
FIG. 12 is a block diagram showing a remote diagnosis system in a seventh embodiment of the present invention.
Figure 13:
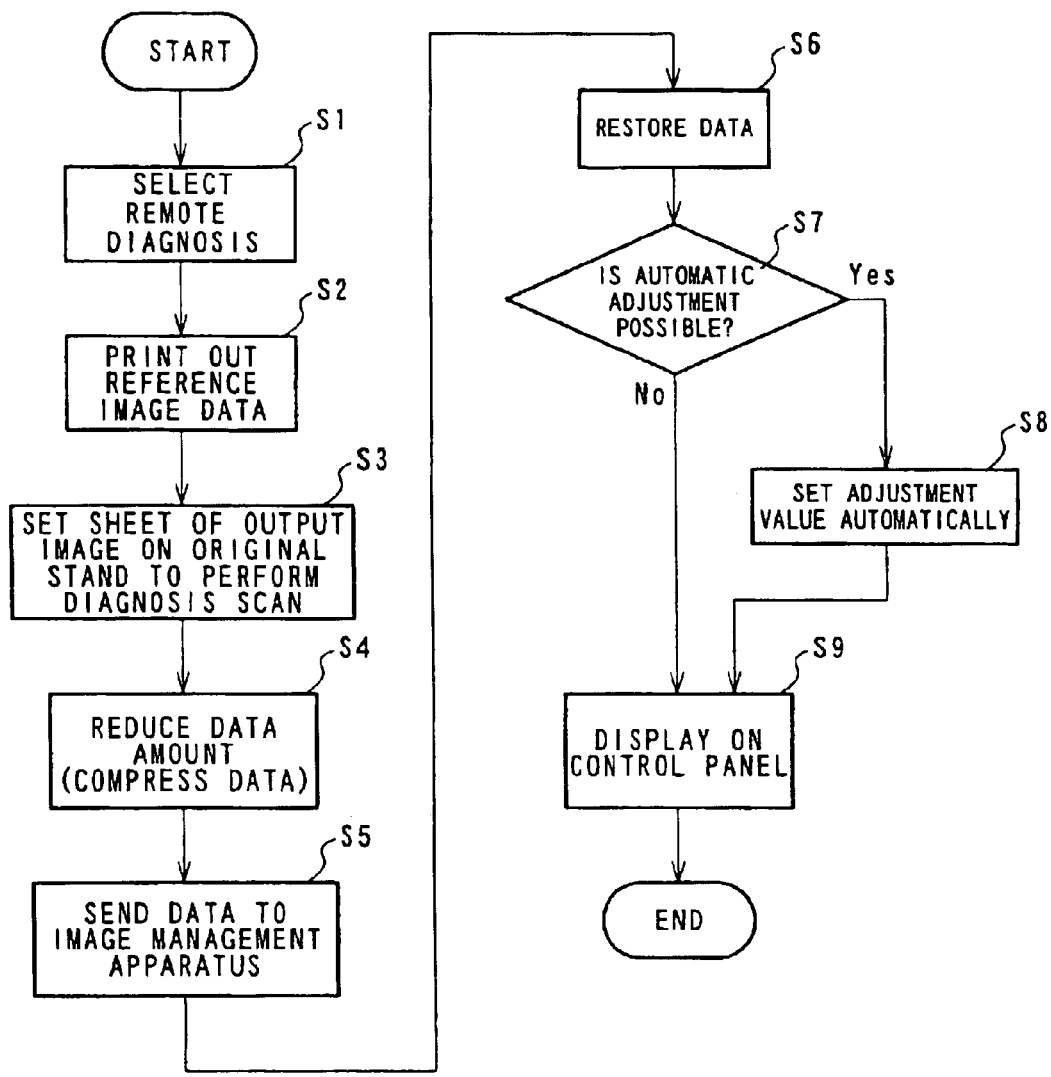
FIG. 13 is a flowchart showing operations of the remote diagnosis system.

A remote diagnosis system of the present invention will be described as a seventh embodiment of the present invention. FIG. 12 is a block diagram showing the remote diagnosis system in this embodiment. FIG. 13 is a flowchart showing operations of the system.

As shown in FIG. 12, the remote diagnosis system of the present invention includes an image processing apparatus 900 having a data transmission apparatus 801 and an image management apparatus 1020 having a data reception apparatus 807. The image processing apparatus 900 and the image management apparatus 1020 are connected such that both of them can communicate with each other.

Here, the data transmission apparatus 801 includes: a differential data calculation section 11 which compares object data read from the image processing apparatus 900 (scanner 901) with reference (image) data and calculates a difference between both the data as differential data; a differential data amount reduction section 12 which reduces a data amount of the differential data such that image data from each section can be sent easily; and data transmission section 13 which sends differential data 104 with its data amount reduced to the data reception apparatus 807. In FIG. 12, the data transmission apparatus 801 is equivalent to a network controller and the image processing apparatus 900 is equivalent to a copier, and both of them are connected via interfaces (I/Fs) 907 and 1004.

The image processing apparatus 900 includes: an image reading section 901 which reads reference (image) data in accordance with a command inputted by an input section 904 performing an operation input; an image processing section 902 which processes the read reference (image) data; an image forming section 903 which outputs the processed reference (image) data (to a sheet); and a control section 906 which controls reference (image) data with the reference (image) data read by the image reading section 901 as object data.

Note that the image processing apparatus 900 is not necessarily constituted independently from the data transmission apparatus 801 as shown in FIG. 12, and they may be constituted integrally.

The data reception apparatus 807 constituted in the image management apparatus 1020 includes: a differential data restoration section 21 which receives compressed differential data sent from the image processing apparatus 900 side and restores it to its original state; an object data restoration section 22 which restores object data based upon reference data stored in advance and the restored differential data; data transmission sections 1021 and 1022 which can send information data (or control data) concerning the restored object data to the data transmission apparatus 801 as required.

Note that any image management apparatus may be used as the image management apparatus 1020 as long as it includes the data reception apparatus 807. Usually, the image management apparatus 1020 includes an external apparatus or the like such as a database 1025 in which data necessary for checking deficiency of restored data is stored.

Next, operations of the remote diagnosis system will be described with reference to FIG. 13. For example, when a user judges that an image, which is outputted when the user uses the image processing apparatus 900, is a defective image, the user selects remote diagnosis from a control panel menu of an operation input section 904 or 1006 to start diagnosis (S1). At this point, indications of the start of diagnosis and printing out of reference data appear on a control panel 904 or 1006, and reference (image) data stored in a memory 909 in the control section 906, which controls the image reading section 901, the image processing section 902, and the image forming section 903, is outputted to a sheet or the like via the image processing section 902 and the image forming section 903 (S2). Since an indication urging the user to read the outputted image appears on the control panel 904 or 1006, the user sets the sheet or the like on which the image is outputted on an original stand of the image reading section 901 and starts reading of the image (S3). Image data obtained in the image reading section 901 is sent from the interfaces (I/Fs) 907 and 1004 to the network controller 801 as object data and temporarily stored in a main memory 1003 through the memory controller 1002. As a result, since the reference (image) data undergoes predetermined processing in the image forming section 903, the image processing section 902, and the image reading section 901 to become object data, in the case in which a part of these sections has abnormality, the image data includes an abnormal part and an image different from the reference data is obtained. The remote diagnosis system calculates differential data of the reference (image) data of the memory 909 and the object data 102 stored in the main memory 1003 in a CPU 1001 in the differential data calculation section 11 of the network controller 801, and reduces a data amount of the differential data in the differential data amount reduction section 12 (S4). Then, the remote diagnosis system sends the differential data with its data amount reduced to the image management apparatus 1020 through an LAN controller 1005 or a modem 1007 (S5). In the image management apparatus 1020, the remote diagnosis system decompresses the differential data 109 sent through a router 1021 and reads reference (image) data corresponding to the differential data. Then, the remote diagnosis system compounds the differential data and the reference (image) data to restore object (image) data (S6). In the image management apparatus 1020, the remote diagnosis system specifies a cause of the defective image by diagnosing the restored (image) data, and judges whether or not the cause can be eliminated by automatic adjustment of the image processing apparatus 900 if correction data is sent to it (S7). For example, if the cause can be adjusted only by correction of a value set in a resistor 908 in the image processing apparatus 900, the remote diagnosis system can perform automatic setting of the image processing apparatus 900 by sending the correction data of the resistor 908 through an opposite route from the image management apparatus 1020 (S8). Then, the remote diagnosis system displays an indication notifying the user that the automatic adjustment has been performed on the control panel 904 or 1006 and ends the diagnosis. On the other hand, in the case in which it is judged that automatic adjustment is impossible, the remote diagnosis system displays an indication to the effect that a serviceman is to be dispatched on the control panel 904 or 1006 (S9) and ends the series of processing. Note that the program of the present invention is stored, for example, in the main memory 1003 as a computer readable recording medium. As this recording medium, a recording medium of any form such as a flexible disk, a hard disk, an optical disk (CD-ROM, etc.), a magneto-optical disk (MO, etc.), or a semiconductor memory may be adopted as long as it can store a program and is computer readable.

As described above in detail, according to the present invention, so-called multimedia data or the like such as still image data, which is a large amount of data, can be sent and received at a low communication cost while suppressing deterioration of data as much as possible. In particular, according to the present invention, since an existing communication network can be used in sending and receiving such a large amount of data, the infrastructure of leased line installation may not be arranged. In addition, since the present invention is for sending differential data of data to be a reference (reference data) and data desired to be sent (object data), data with a less difference between the reference data and the object data has a larger advantage in terms of deterioration of data and communication costs. Therefore, the present invention particularly displays an effect in a large amount of multimedia data or the like which are processed and corrected based upon reference data. Moreover, according to the present invention, even if an image processing apparatus having a data transmission apparatus and an image management apparatus having a data reception apparatus are located in remote places from each other, if both of the apparatuses are connected in a state in which they can communicate with each other and image data to be a reference of image data (reference data) outputted by the image processing apparatus is held by the image management apparatus in advance, it is sufficient to send differential data of image data (object data) desired to be diagnosed, which is outputted by the image processing apparatus, and image data to be a reference of the image data (reference data) to the image management apparatus. Therefore, there is an effect that a data transmission and reception system with a low communication cost in which deterioration of data is suppressed can be established. As a result, image data (object data) to be an object of diagnosis can be obtained in the image management apparatus at a low communication cost while suppressing deterioration of the data. Therefore, there is an effect that the present invention can be applied to a remote diagnosis system which diagnoses, for example, whether or not a data image outputted by the image processing apparatus is a defective image.

What is claimed is:

1. A data transmission apparatus comprising:
    a differential data calculation section for, assuming that data to be a reference is reference data and data to be compared with the reference data is object data, comparing the reference data and the object data to calculate a difference between the object data and the reference data as differential data;
    a differential data amount reduction section for reducing a transmission data amount of the differential data obtained by said differential data calculation section such that the differential data can be restored;
    a data transmission section for sending the differential data with a data amount thereof reduced by said differential data amount reduction section; and
    a reference data ID assignment section for, in the case in which there are a plurality of reference data, assigning an ID number to each reference data, wherein said differential data amount reduction section reduces a data amount of a reference data ID assigned by said reference data ID assignment section together with a data amount of the differential data obtained by said differential data calculation section.

2. The data transmission apparatus according to claim 1, further comprising a reference data storage section having stored therein the reference data in advance prior to the comparison with the object data.

3. A data transmission apparatus comprising:
    a differential data calculation section for, assuming that data to be a reference is reference data and data to be compared with the reference data is object data, comparing the reference data and the object data to calculate a difference between the object data and the reference data as differential data;
a differential data amount reduction section for reducing a transmission data amount of the differential data obtained by said differential data calculation section such that the differential data can be restored; and
a data transmission section for sending the differential data with a data amount thereof reduced by said differential data amount reduction section,
wherein said differential data calculation section divides the object data into a plurality of predetermined areas and calculates a difference between the object data and the reference data for each area.

4. The data transmission apparatus according to claim 3, further comprising a reference data ID assignment section for, in the case in which there are a plurality of reference data, assigning an ID number to each reference data.

5. The data transmission apparatus according to claim 4, wherein said reference data ID) assignment section assigns ID numbers with lesser data amounts to the plurality of reference data in order from the reference data with higher frequency of utilization.

6. The data transmission apparatus according to claim 4, wherein said reference data ID assignment section assigns the reference data based upon a degree of similarity between the reference data and the object data.

7. A data transmission apparatus comprising:
a differential data calculation section for, assuming that data to be a reference is reference data and data to be compared with the reference data is object data, comparing the reference data and the object data to calculate a difference between the object data and the reference data as differential data;
a differential data amount reduction section for reducing a transmission data amount of the differential data obtained by said differential data calculation section such that the differential data can be restored;
a data transmission section for sending the differential data with a data amount thereof reduced by said differential data amount reduction section;
a motion vector calculation section for calculating a motion vector indicating an amount of positional deviation between the reference data and the object data which occurs when a difference between the reference data and the object data is found; and
a motion compensation section for correcting an amount of positional deviation between the reference data and the object data based upon the motion vector calculated by said motion vector calculation section prior to the calculation of the differential data by said differential data calculation section.

8. The data transmission apparatus according to claim 7, wherein said motion vector calculation section comprises an area division section for dividing the reference data and the object data into predetermined divided areas and associates data for each divided area of the reference data and the object data, which are divided by said area division section, with each other to calculate a motion vector between the reference data and the object data for each area, and
said motion compensation section corrects an amount of positional deviation of data for each divided area of the reference data with respect to the data for each divided area of the object data based upon the motion vector calculated by the motion vector calculation section.

9. The data transmission apparatus according to claim 7, wherein said motion vector calculation section calculates the motion vector according to the affine transformation.

10. A data transmission apparatus comprising:
a differential data calculation section for, assuming that data to be a reference is reference data and data to be compared with the reference data is object data, comparing the reference data and the object data to calculate a difference between the object data and the reference data as differential data;
a differential data amount reduction section for reducing a transmission data amount of the differential data obtained by said differential data calculation section such that the differential data can be restored;
a data transmission section for sending the differential data with a data amount thereof reduced by said differential data amount reduction section;
an image reading device; and
an image forming device;
wherein the reference data is read out and stored in a memory from which the reference data can be printed out by said image forming apparatus, and the object data is image data which is obtained by reading a print image, which is read out from said memory and printed out by said image forming device, with said image reading device.

11. A data transmission program which is stored in a computer readable recording medium in order to cause a computer to execute data transmission processing, the data transmission program causing the computer to execute:
a differential data calculation step of, assuming that data to be a reference is reference data and data to be compared with the reference data is object data, comparing the reference data and the object data to calculate a difference between the reference data and the object data as differential data;
a differential data amount reduction step of reducing a transmission data amount of the differential data obtained by said differential data calculation step such that the differential data can be restored;
a data transmission step of sending the differential data with a data amount thereof reduced by said differential data amount reduction step; and
a reference data ID assignment step of, in the case in which there are a plurality of reference data, assigning an ID number to each reference data,
wherein said differential data amount reduction step reduces a data amount of a reference data ID assigned in said reference data ID assignment step together with a data amount of the differential data obtained in said differential data calculation step.

12. A data transmission method comprising:
a differential data calculation step of, assuming that data to be a reference is reference data and data to be compared with the reference data is object data, comparing the reference data and the object data to calculate a difference between the reference data and the object data as differential data;
a differential data amount reduction step of reducing a transmission data amount of the differential data obtained by said differential data calculation step such that the differential data can be restored;
a data transmission step of sending the differential data with a data amount thereof reduced by said differential data amount reduction step; and a reference data ID assignment step of, in the case in which there are a plurality of reference data, assigning an ID number to each reference data;

wherein said differential data amount reduction step reduces a data amount of a reference data ID assigned in said reference data ID assignment step together with a data amount of the differential data obtained in said differential data calculation step.

13. A data reception apparatus for receiving data which, assuming that a difference between reference data to be a reference and object data being an object of transmission is found as differential data, is sent with a transmission data amount of the differential data reduced such that the differential data can be restored, the data reception apparatus comprising:

a data receiving section for receiving the differential data from a data transmission apparatus separate from the data reception apparatus;

a differential data restoration section for restoring the differential data from the received data received from the data transmission apparatus separate from the data reception apparatus; and an object data restoration section for restoring the object data based upon the differential data restored by said differential data restoration section and the reference data.

14. The data reception apparatus according to claim 13, further comprising a reference data storage section having stored therein the reference data compared with the object data.

15. A data reception program which is stored in a computer readable recording medium of a data reception apparatus in order to cause the computer to execute processing for receiving data which, assuming that a difference between reference data to be a reference and object data being an object of transmission is found as differential data, is sent with a transmission data amount of the differential data reduced such that the differential data can be restored, the data reception program causing the computer to execute:

a data receiving step of receiving the differential data from a data transmission apparatus separate from the data reception apparatus;

a differential data restoration step of restoring the differential data from the received data received from the data transmission apparatus separate from the data reception apparatus; and an object data restoration step of restoring the object data based upon the differential data restored by said differential data restoration step and the reference data.

16. A data reception method of receiving data via a data reception apparatus which, assuming that a difference between reference data to be a reference and object data being an object of transmission is found as differential data, is sent with a transmission data amount of the differential data reduced such that the differential data can be restored, the data reception method comprising:

a data receiving step of receiving the differential data from a data transmission apparatus separate from the data reception apparatus;

a differential data restoration step of restoring the differential data from the received data received from the data transmission apparatus separate from the data reception apparatus; and an object data restoration step of restoring the object data based upon the differential data restored by said differential data restoration step and the reference data.

17. A data transmission and reception system comprising:

a data transmission apparatus for sending data; and a data reception apparatus for receiving the data sent by said data transmission apparatus, wherein said data transmission apparatus comprises:

a differential data calculation section for, assuming that data to be a reference is reference data and data to be compared with the reference data is object data, comparing the reference data and the object data to calculate a difference between the object data and the reference as differential data;

a differential data amount reduction section for reducing transmission data amount of the differential data obtained by said differential data calculation section such that the differential data can be restored; and a data transmission section for sending the differential data with a data amount thereof reduced by said differential data amount reduction section, and said data reception apparatus comprises:

a reference data storage section for storing the reference data;

a differential data restoration section for restoring the differential data from the received data; and an object data restoration section for restoring the object data based upon the differential data restored by said differential data restoration section and the reference data stored in said reference data storage section, wherein said data transmission apparatus is separate from the data reception apparatus.

18. The data transmission and reception system according to claim 17, wherein said data transmission apparatus further comprises an image reading device and an image forming device, the reference data is read out and stored in a memory from which the reference data can be printed out by said image forming apparatus, and the object data is image data which is obtained by reading a print image, which is read out from said memory and printed out by said image forming device, with said image reading device, and said data reception apparatus is a data reception apparatus for receiving data sent from said data transmission apparatus in order to remotely diagnose said image reading device or said image forming device.

* * * * *